May 6, 1952     J. L. GILMORE     2,595,453
STAND AND DOLLY FOR TRAILER TONGUES
Filed April 9, 1949     2 SHEETS—SHEET 1
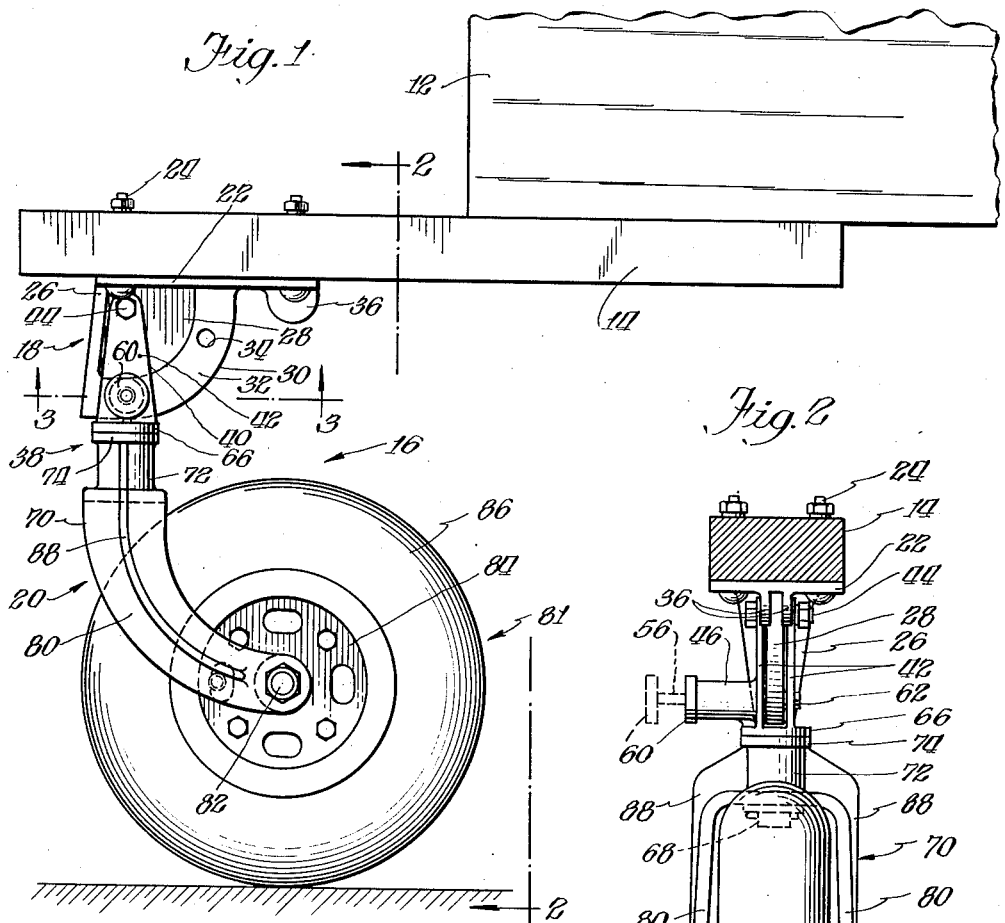
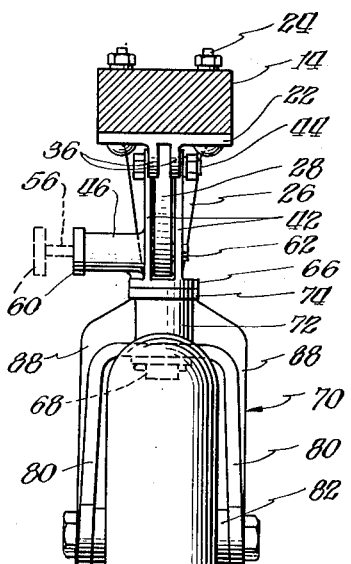
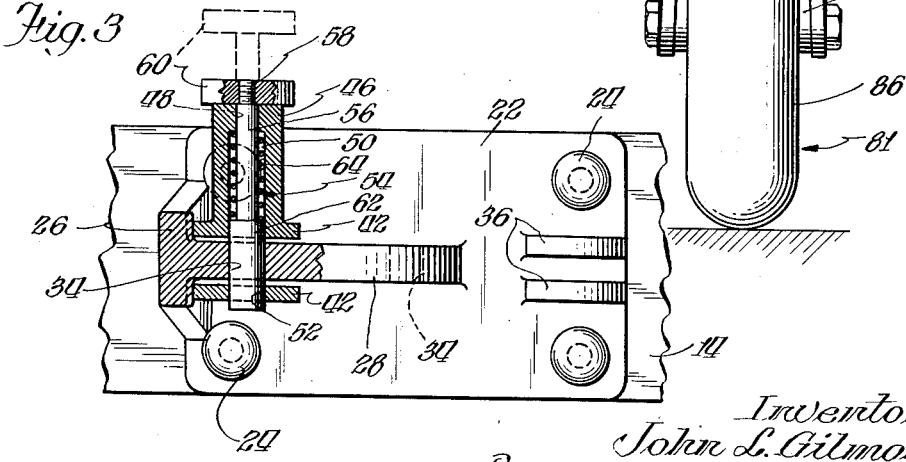
Inventor:
John L. Gilmore
By: Bair & Freeman
Attys.

May 6, 1952 J. L. GILMORE 2,595,453
STAND AND DOLLY FOR TRAILER TONGUES
Filed April 9, 1949 2 SHEETS—SHEET 2
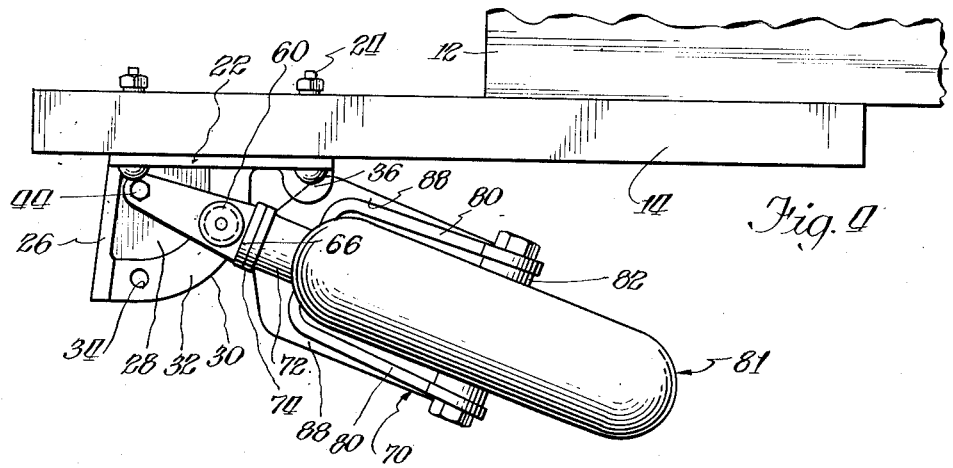
Fig. 4
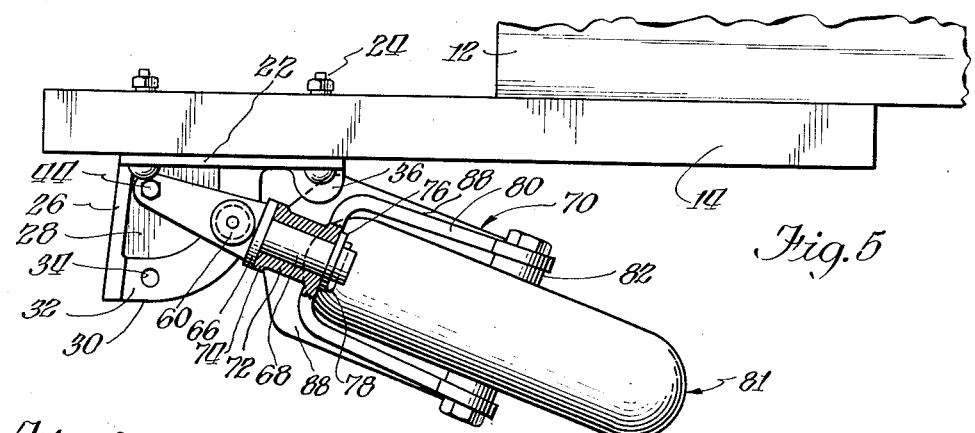
Fig. 5
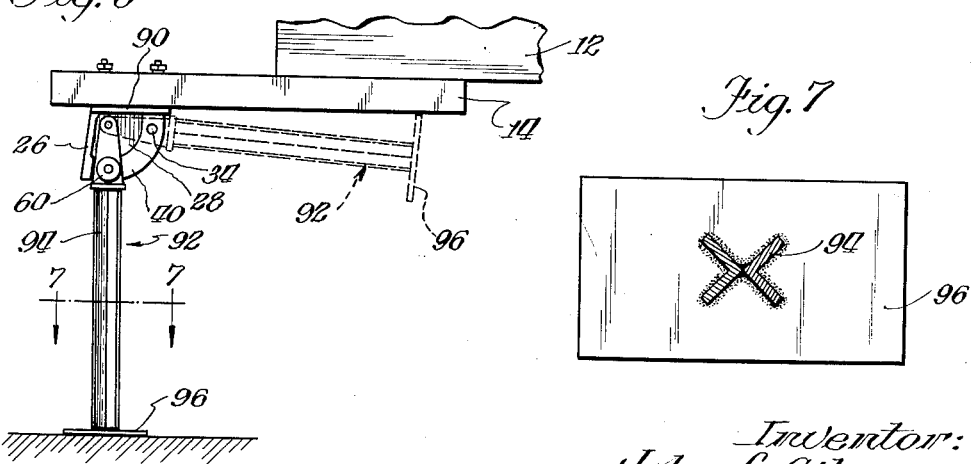
Fig. 6
Fig. 7
Inventor:
John L. Gilmore
By: Bair & Freeman
Attys.

Patented May 6, 1952

2,595,453

UNITED STATES PATENT OFFICE 2,595,453

STAND AND DOLLY FOR TRAILER TONGUES

John L. Gilmore, Kansas City, Mo.

Application April 9, 1949, Serial No. 86,465

3 Claims. (Cl. 280—33.4)

This invention relates to a stand and dolly for a trailer; and is of the type which is movable and out of operative position.

The stand and dolly of the present invention are particularly adaptable to a trailer used for such equipment as air compressors and welders. A trailer carrying such equipment is ordinarily pulled to a desired location and then detached from the draft vehicle. A stand or dolly is secured to the trailer tongue, for supporting the tongue, and the trailer, when in its location, but it is desired that the stand or dolly be moved to inoperative position when the trailer is being pulled or transported.

If the trailer is to remain stationary in its location, a stand is employed for supporting the trailer tongue; however it is often desired to move the trailer about, to a certain extent, by man-handling, when it is in location, and for such purpose a dolly is employed.

An object of the present invention is the provision of a stand and dolly for a trailer tongue having a novel construction whereby the stand or dolly can be readily and easily moved to operative position and to inoperative position.

Another object is the provision of a stand and dolly of the character referred to, which can be easily and readily locked in operative or inoperative position.

Still another object is the provision of a dolly having a caster wheel movable to lowered operative position, and to raised inoperative position, in which the caster wheel can be turned with its flat side disposed downwardly when in inoperative position, so that the caster wheel is thus raised to its greatest effective height.

A further object of the invention is the provision of a stand and dolly for a trailer tongue which can be moved to operative position and to inoperative position without the use of tools for the purpose.

With these and other objects in view, my invention consists in the construction, arrangement, and combination of the various parts of my device whereby the objects contemplated are attained, as hereinafter more fully set forth, pointed out in the claims, and illustrated in the accompanying drawings, wherein:

Figure 1 is a side view of a portion of a trailer showing the stand and dolly of the present invention applied thereto;

Figure 2 is a view taken on line 2—2 of Figure 1;

Figure 3 is a view taken on line 3—3 of Figure 1;

Figure 4 is a view similar to Figure 1 but with the dolly in raised position and turned on its side;

Figure 5 is a view similar to Figure 4 but showing the dolly raised and turned on its opposite side, this view showing a portion of the device in section;

Figure 6 is a view similar to Figure 1 but showing a stand instead of a dolly; and Figure 7 is an enlarged view taken on line 7—7 of Figure 6.

Referring now in detail to the drawings, the numeral 12 indicates a portion of a trailer of the type which is ordinarily used for air compressors or welders or similar equipment. Such a trailer is well known and includes a pair of wheels which are not shown in the present illustration, and a forwardly extending tongue 14. The tongue 14 may be secured to the trailer body in any suitable manner and extends forwardly therefrom a short distance. A clevis or other suitable connecting means is provided at the forward end of the tongue, for connection with a draft vehicle; it is deemed unnecessary to illustrate such a connecting means, since any desired or conventional means may be employed.

The numeral 16 indicates as a whole the dolly forming a part of the present invention. The dolly includes a bracket 18 and a caster wheel 20. The bracket 18 preferably is in the form of a casting and includes a base plate 22 in the form of a flat plate which lies flat against the undersurface of the tongue 14. The base plate 22 is provided with a plurality of holes for receiving bolts 24 which are inserted through the holes in the base plate and aligned holes in the tongue, appropriate nuts and lock washers being applied thereto for securing the bracket to the tongue.

The bracket 18 also includes a front plate 26 at the forward end of the base plate 22 and extends downwardly therefrom in a substantially vertical position forming a slightly obtuse angle with the base plate 22. The bracket 18 also includes a web 28 integral with and interconnecting the plates 22 and 26. The web 28 is substantially a quadrant and has an arcuate outer edge 30, adjacent which is a guiding and bearing surface 32 following the curvature of the edge 30. A plurality of holes 34 is formed in the web in the surface 32.

Adjacent the rear end of the plate 22 and outwardly beyond the web 28 is a pair of projections 36 which are in the form of flat platelike elements although of minor size. Attention is directed particularly to Figure 3 which in conjunction with Figure 1 illustrates the size and shape of the projections 36. The projections 36 are substantially parallel and are spaced apart on a line disposed substantially transverse to the web 28.

The caster wheel 20 includes what will be referred to as a supporting member 38 which serves to support the trailer tongue 14 when the wheel engages the ground. The supporting member 38 includes a mounting fork 40 at its upper end, preferably a casting, having a pair of fork elements 42. The fork 40 tapers slightly in an upward direction and is so disposed that the fork elements 42 straddle the web 28. The fork elements 42 at their upper ends are provided with holes for the reception of a bolt 44, the bolt also being passed through a hole in the web 28 adjacent the juncture of the plates 22 and 26. The supporting member 38 is thus pivotally mounted in the web 28 on a horizontal axis and is adapted to swing from lowered to upper positions.

Formed on and preferably integrally with one of the fork elements 42 adjacent the lower end thereof is a laterally extending sleeve or tubular member 46, having at its outer end, a relatively small opening 48 and inwardly thereof an enlarged cavity 50. The cavity 50 opens through the respective fork element 42, and in alignment with the cavity 50 is an opening 52 in the opposite fork element 42, of the same diameter as the cavity 50.

A locking pin indicated generally at 54 is mounted in the tubular member 46 and includes a shank portion 56 of relatively small diameter which is slidable in the opening 48. The outer end of the shank 56 is of reduced diameter and threaded as indicated at 58 and on this threaded portion is a disk or hand knob 60 mounted by means of threaded engagement. The inner end of the locking pin 54 is in the form of a plunger element 62 of greater diameter than the pin 56 and of substantially the same diameter as the cavity 50. A compression spring 64 surrounds the shank 56 in the cavity 50 and is biased between the plunger element 62 and the shoulder of the cavity 50 at the opposite end of the latter. The plunger element 62 is of such a length as to extend into and through the opening 52 in the opposite fork element 42. The plunger element 62 also is adapted to slide through the holes 34 as will be explained later.

The lower end of the fork 40 is provided with a radial flange 66 and a downwardly extending stub shaft 68 preferably formed integral therewith (Figures 2 and 5).

The supporting member 38 includes a wheel fork 70, preferably a casting, having a tubular element 72, the latter having an annular flange 74 at its upper end. The tubular element 72 is fitted over the stub shaft 68 as best shown in Figure 5 with the flange 74 in abutting engagement with the flange 66. The stub shaft 68 extends through the tubular member 72 and a washer 76 is fitted over the stub shaft and a cotter key 78 is inserted through a hole therein for securing the wheel fork 70 to the mounting fork 40. The wheel fork 70 includes spaced apart fork elements 80 in the form of parallel platelike elements and as is usual in caster wheels they curve from the vertical and in the position of the caster wheel illustrated in Figure 2, they curve to the rear. The lower ends of the fork elements 80 are provided with bearing openings for supporting the wheel 81, the openings directly receiving an axle 82 mounted in the disc 84 of the wheel, which in this instance has a pneumatic tire 86. The detail construction of the wheel 81 proper need not be dwelt upon but it is pointed out herein that the diameter of the wheel is a substantial portion of the total distance from the ground to the tongue 14. In keeping with the fact that the wheel is a caster wheel, the axis of the wheel is displaced horizontally from a vertical line running through the pivot point 44.

Formed integral with the fork elements 80 are ribs or webs 88 one on each fork element and extending laterally outwardly therefrom, or substantially perpendicularly to the planes of the fork elements 80. The webs or ribs 88 may extend downwardly to adjacent the lower ends of the fork elements and extend upwardly to the upper end of the tubular member 72 and at points adjacent the tubular member 72 they extend laterally outwardly therefrom a considerable distance.

The stand illustrated in Figures 6 and 7 includes a construction similar in many respects to the dolly heretofore described. The stand illustrated in Figures 6 and 7 differs from the dolly in that the base plate 90 which corresponds to the base plate 22 is shorter than the latter and does not have the projections 36.

The numeral 92 in Figure 6 illustrates a supporting member which differs from the dolly and caster wheel of the previous embodiment. The supporting member includes a fork 40 in all respects like the fork 40 in the previous embodiment. At the lower end of the fork 40 is a shank 94 rigidly secured thereto. The shank 94 may be in the form of a pair of V-shape elements as illustrated in Figure 7 formed by welding together angle members with the apexes of the angles abutting. A supporting plate 96 is welded to the lower end of the shank 94. The plate 96 is of considerable dimension relative to the transverse dimension of the shank 94.

Figure 1 illustrates the trailer 12 in location or in a position in which the equipment in the trailer is being used. In such a position the supporting member 38 supports the tongue 14 and thereby the trailer 12 in the desired position. To carry out this purpose the supporting member is permitted to drop to the position shown after having first pulled outwardly on the hand knod 60 to withdraw the plunger element 62 into the cavity 50. When the cavity 50 is in alignment with the lower hole 34 the hand knob 60 is released and the plunger element 62 slides into the lower hole 34 and locks the supporting member in lowered position. In such a position the trailer can be manhandled and moved to a limited extent when in location and to this end the caster wheel 20 enables the forward end of the trailer to be moved in any direction.

When it is desired to pull or transport the trailer, the connecting means on the tongue 14 (not shown) is connected to the draft implement, such as a truck. When so connected the tongue 14 is supported by the draft implement and the dolly or supporting member 38 can be moved upwardly to transport position. The hand knob 60 is pulled outwardly withdrawing the plunger element 62 from the lower hole 34 and the supporting member 38 is swung to upper position, that is, rotated about the pivot 44 in a counterclockwise direction (Figure 1). In the same upward movement of the supporting member or dolly the wheel fork 70 is rotated a quarter turn in either direction so that one or the other of the ribs or webs 88 is in alignment with the space between the projections 36. As the wheel or dolly is then moved to upper position, the upper rib or web 88 is inserted between the projections 36, and when the rib is between the projections, the dolly is in the position wherein the cavity 50 and hole 52 are aligned with the upper hole 34, and at that time the hand knob 60 is released, permitting the plunger element 62 to slide into the upper hole 34. The supporting member 70 is then locked in upper position, and the dolly or caster wheel is locked against rotation. Figure 4 shows the caster wheel rotated a quarter turn to one position, while Figure 5 illustrates it rotated a quarter turn in the opposite direction, illustrating the fact that the wheel can be turned to either side and locked in upper position.

The advantage of being able to lock the wheel in such a position is believed evident but it is nevertheless pointed out that when the wheel is in such a position the clearance between itself and the ground is much greater than would be the case if the wheel were permitted to depend directly downwardly, i. e. lie in a vertical plane.

The caster wheel and the supporting member 70 are usually regarded as a dolly but it will also be understood that they are essentially a stand, that is, they support the forward end of the trailer. When it is not required that the trailer be manhandled or if it is necessary for it to remain fixed in a position without movement, the stand illustrated in Figures 6 and 7 is employed. The stand 60 when locked in its lowered position as illustrated in full lines in Figure 6, supports the trailer in fixed position and the trailer cannot be moved. The means for locking the stand in lowered or upper positions is the same as illustrated in the first embodiment and as illustrated in dotted lines in Figure 6 the stand 92 can be raised upwardly to a considerable height providing great clearance between itself and the ground.

It will be evident that one of the great advantages of the present invention is that the dolly or stand can be manipulated easily and readily and it is unnecessary to employ special tools for the purpose. This is true both in locking the stand in operative or inoperative position, and in locking the caster wheel against rotation. Neither the dolly nor the stand is heavy or weighty, and consequently can be easily manipulated by a single person.

I believe it to be entirely novel to provide means for retaining the caster wheel in turned over or flat positions and especially by such simple means as the web or rib 88 and the projections 36.

While I have herein shown a particular embodiment of my invention, it will be understood, of course, that I do not wish to be limited thereto since many modifications may be made, and I therefore contemplate by the claims appended hereto to cover any such modifications or substitutions of mechanical equivalents as fall within the true spirit and scope of my invention without sacrificing any of its advantages.

I claim as my invention:

1. In an article of the character disclosed, a mounting bracket adapted to be mounted on the under surface of a trailer tongue, a supporting member pivoted on said bracket and swingable on a horizontal axis to a lowered position for engaging the ground and to an upper position, said supporting member having a ground engaging wheel, the lower portion of said supporting member being rotatable on an axis extending longitudinally of the supporting member, a pair of downwardly extending projections on said bracket and thereby below said trailer tongue, said projections being spaced apart on a line extending substantially in the direction of the axis of said supporting member, a radially extending rib on said rotatable portion, said rib extending in a direction substantially parallel with the axis of said wheel, said rib being insertable between said projections when said supporting member is raised to said upper position, and means for locking said supporting member in said upper position, said projections and rib, when in interengaging position, being effective for locking said rotatable portion against rotation.

2. In an article of the character disclosed, a mounting bracket adapted to be mounted on the under surface of a trailer tongue, a supporting member pivoted on said bracket swingable on a horizontal axis to a lowered position for engaging the ground and to an upper position, said supporting member having a wheel fork and a caster wheel therein, said wheel fork being rotatable on an axis extending longitudinally of said supporting member, said wheel fork having lateral ribs on opposite sides thereof extending parallel with the axis of said wheel, a pair of downwardly extending projections on said bracket and thereby below said trailer tongue, said projections being spaced apart on a line extending in the direction of the axis of said supporting member, said ribs alternately being insertable between said projections when said supporting member is moved to said upper position, and means for locking said supporting member in said upper position, said projections and either of said ribs, when in engagement, being effective for locking said wheel fork against rotation.

3. In an article of the character disclosed, a bracket adapted to be mounted on a trailer tongue, said bracket being a casting and having a base plate adapted for abutment with the trailer tongue and a downwardly extending plate adjacent one end of said base plate, said bracket having a downwardly extending web interconnecting said plates, said web having an arcuate marginal edge and a guiding and bearing surface adjacent said edge, said guiding and bearing surface having a plurality of holes therein, said base plate having a pair of downwardly extending projections disposed outwardly beyond said web and spaced apart in a direction transverse to said web, a supporting member having a mounting fork pivoted in said web adjacent the juncture of said plates with the elements thereof straddling said web, said supporting member having a downwardly extending wheel fork and a caster wheel therein, said wheel fork being rotatable on an axis extending longitudinally of the supporting member, said wheel fork having lateral ribs extending in the direction of the axis of said wheel, said supporting member being swingable to a lowered position for engaging the ground and to an upper position, said ribs being insertable alternately between said projections when said supporting member is raised to said upper position, a slidable locking pin in the elements of said mounting fork, said pin being slidable into one of said holes for locking said supporting member in said lowered position and into another of said holes for locking the supporting member in said upper position, and spring means operable for biasing said pin into said holes.

JOHN L. GILMORE.

REFERENCES CITED

The following references are of record in the file of this patent:

UNITED STATES PATENTS

| Number | Name | Date |
|---|---|---|
| 1,285,929 | Cadman | Nov. 26, 1918 |
| 1,844,003 | Brown | Feb. 9, 1932 |
| 2,296,789 | Johnson | Sept. 22, 1942 |
| 2,335,946 | Klaus | Dec. 7, 1943 |

FOREIGN PATENTS

| Number | Country | Date |
|---|---|---|
| 497,390 | Great Britain | Dec. 15, 1938 |